Figure 4:
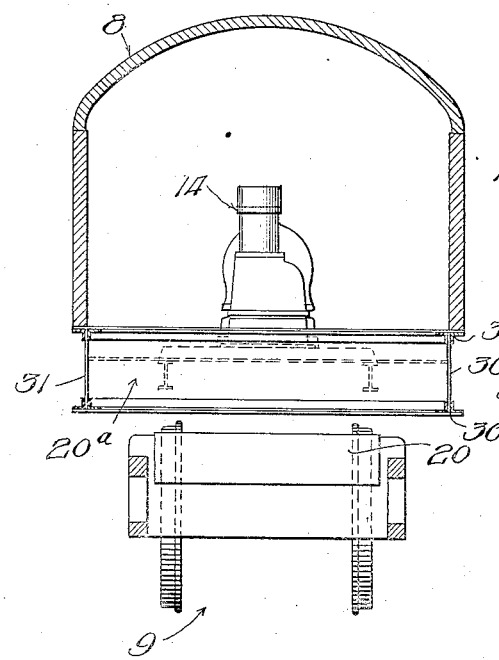

J. H. AMES.
ELECTRIC LOCOMOTIVE OR THE LIKE.
APPLICATION FILED JULY 18, 1913.
1,113,923.
Patented Oct. 13, 1914.
3 SHEETS—SHEET 1.
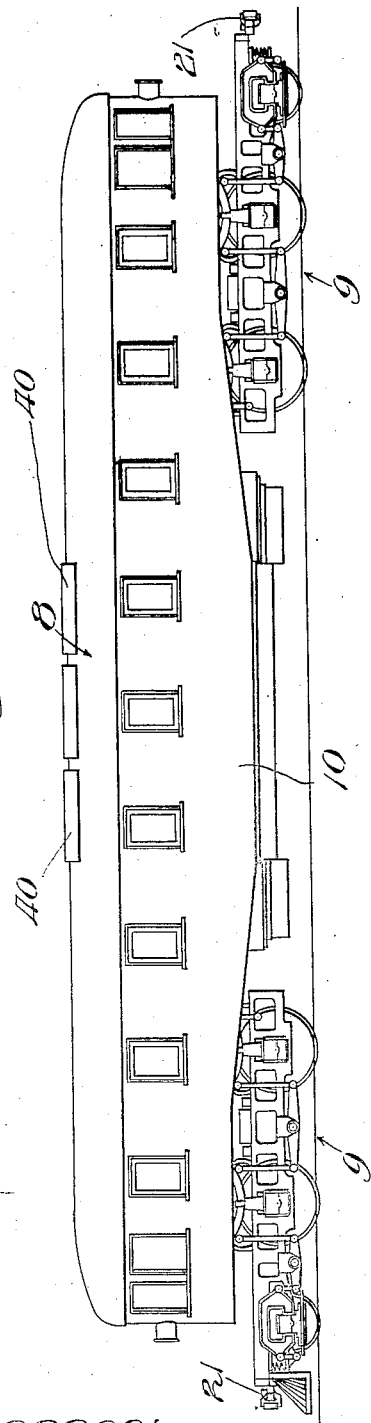
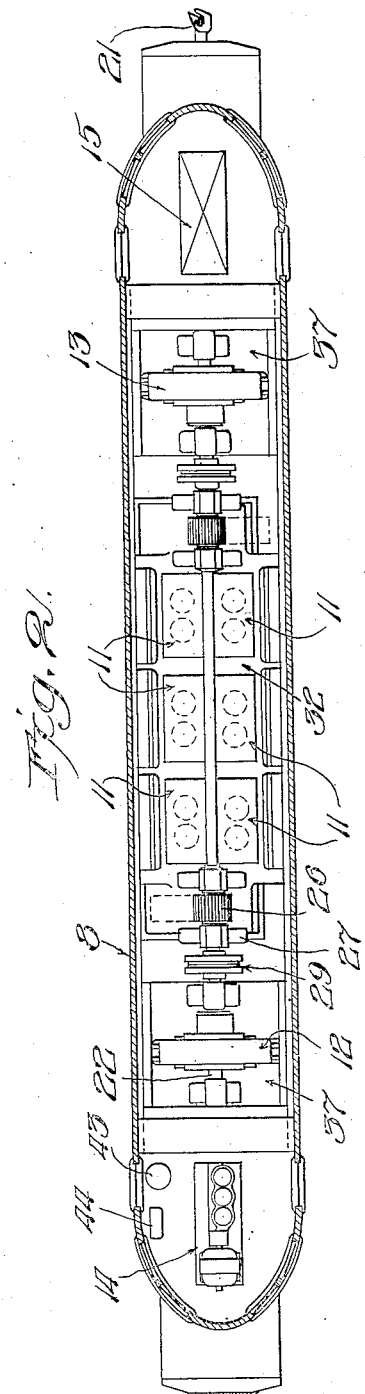

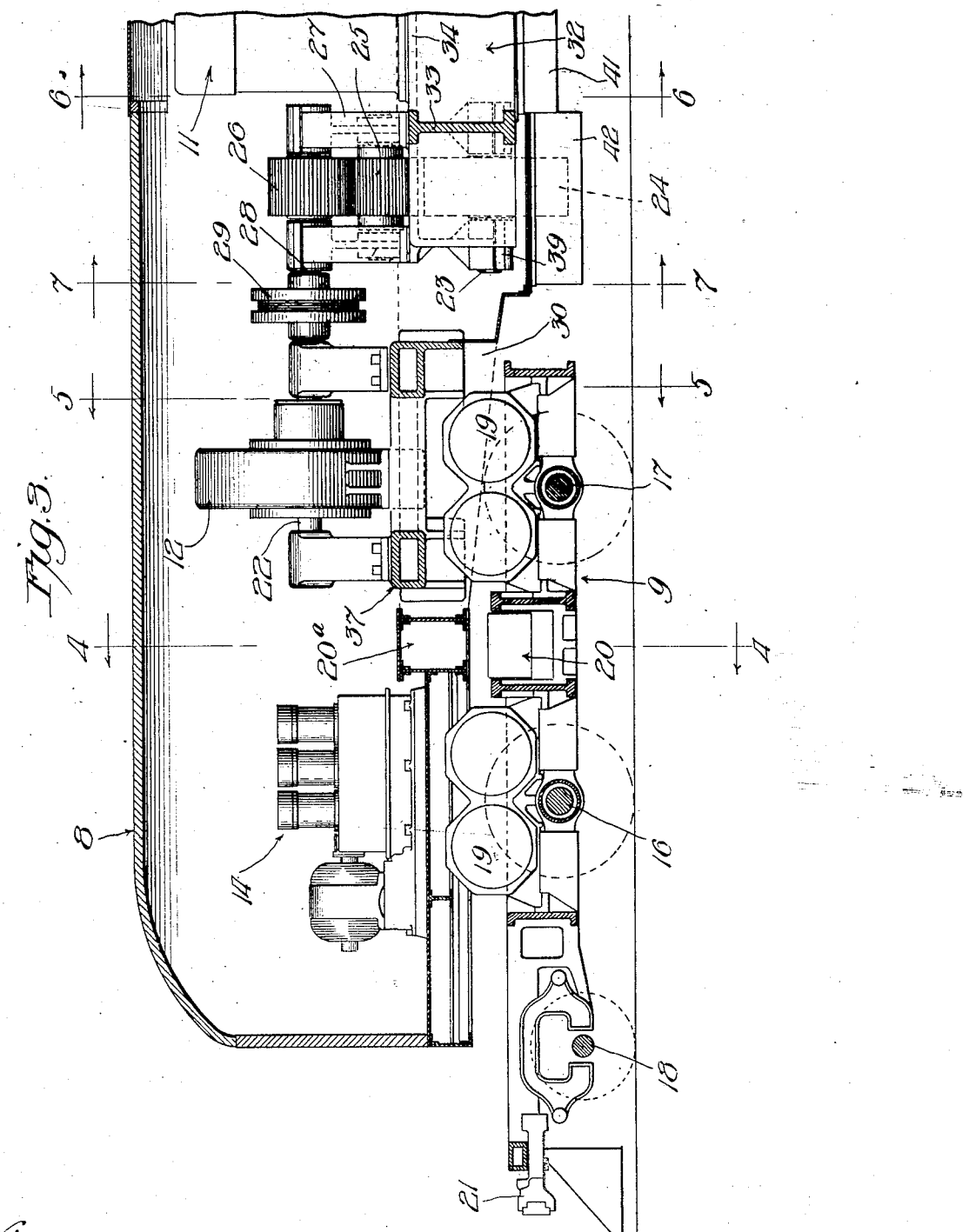

J. H. AMES.
ELECTRIC LOCOMOTIVE OR THE LIKE.
APPLICATION FILED JULY 18, 1913.

1,113,923.

Patented Oct. 13, 1914.
3 SHEETS—SHEET 3.

Witnesses:

Inventor:
Joseph H. Ames

UNITED STATES PATENT OFFICE.

JOSEPH H. AMES, OF CHICAGO, ILLINOIS.

ELECTRIC LOCOMOTIVE OR THE LIKE.

1,113,923.

Specification of Letters Patent. Patented Oct. 13, 1914.

Application filed July 18, 1913. Serial No. 779,806.

*To all whom it may concern:*

Be it known that I, JOSEPH H. AMES, a citizen of the United States, residing at Chicago, in the county of Cook and State of Illinois, have invented certain new and useful Improvements in Electric Locomotives or the like, of which the following is a specification.

The present invention relates to certain improvements in the arrangement and construction of electric locomotives and the like.

The invention has particular reference to certain improvements in that type of locomotive or self-propelled vehicle which is self-contained to the extent that it carries the prime movers by means of which the electric current is generated in the first instance. In this class of vehicle or locomotive, some form of prime mover, such, for example, as an internal combustion engine, serves to drive one or more electric generators, which in turn supply the power current to the motors mounted in the trucks and for any other purpose desired.

I am aware of the fact that self-propelled vehicles of the above general type have heretofore been designed. However, as far as I am aware, such vehicles or locomotives have been of limited capacity or power, so that their usefulness has been restricted to certain comparatively narrow fields of work. These limitations have been imposed largely by reason of the weight and size of the prime movers, it having been impossible in previous arrangements to secure the necessary head-room for the prime mover in combination with the necessary clearance for the accommodation of the trucks, including the driving motors.

The locomotive of the present invention is intended particularly for heavy classes of service, such, for example, as the hauling of through passenger and freight trains. In either of these classes of service, it is necessary to develop a larger amount of power continuously for extended periods of time. For example, the locomotive proportioned as illustrated in the drawings of the present application is intended to develop sixteen-hundred horse-power continuously and two thousand horse-power for short intervals of time.

It will be readily appreciated that, as a matter of practical construction, an internal combustion engine or a set of engines to develop this amount of power, will require a very considerable head-room. However, as a general proposition, the generators for the development of this amount of power will not require as much head-room as the engines. I have availed myself of these facts in the construction of the present locomotive by mounting the engines in the central portion of the structure and between the trucks, while the generators are mounted in the end portions of the structure and above the trucks. In this manner, the additional head-room necessary for the engines is readily obtained, and at the same time a sufficient clearance is allowed for the trucks, including their driving motors.

In addition to the obtaining of a construction embodying the advantageous features above mentioned, another feature of the invention is to so arrange and construct the base portions of the prime movers and of the generators that these base portions may constitute portions of the under-framing of the locomotive itself. In this way the entire structure is thus made integral, as it were, and all of the parts are so interrelated as to secure a maximum of rigidity and strength combined with a minimum of weight and number of parts.

In this connection, another object of the invention is to so arrange and interrelate the various portions of the frame and structure that the pistons and cylinders of the engine can be readily removed for purposes of replacement or repair. It is also intended in this connection to so arrange the parts that replacements and repairs can be effectuated by present shop methods, such, for example, as by the use of the track pit, thereby enabling the locomotive to be assembled or repaired without the necessity of making radical changes in present shop methods.

In connection with the above objects, another object is to provide a construction in which a pair of twin generating units is used, so that in case of the injury or destruction of either one of them, the remaining unit can be used for the supply of current to the end of a division, or until the damaged unit can be again brought into service.

Other objects and uses will appear from a detailed description of the invention which consists in the features of construction and combinations of parts hereinafter described and claimed.

Figure 5:
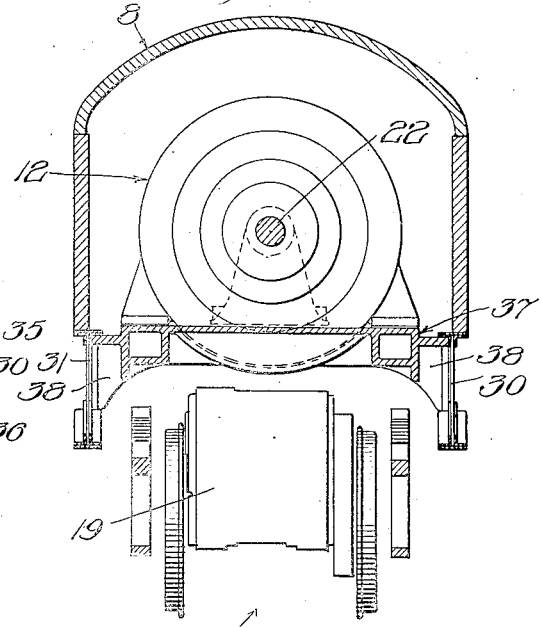
Figure 6:
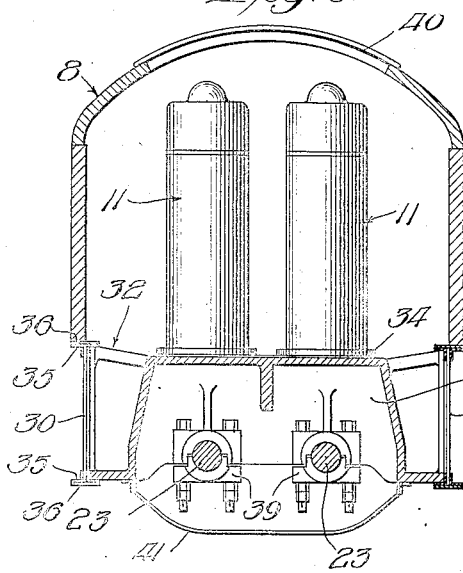
Figure 7:
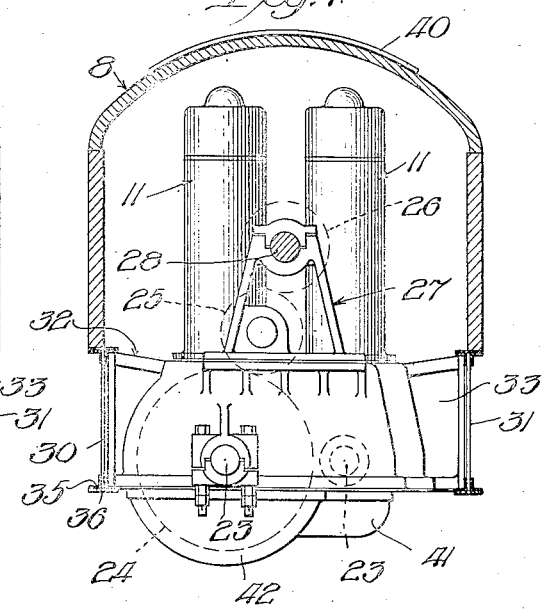

In the drawings, Figure 1 shows a side view of the assembled locomotive; Fig. 2 shows a plan view of the interior of the locomotive; Fig. 3 shows an enlarged vertical section through one end of the locomotive, showing particularly the relative positions of the prime mover, generator, and truck motors; Fig. 4 shows a cross section taken on the line 4—4 of Fig. 3 looking in the direction of the arrows, the forward motors being removed from the truck; Fig. 5 shows a cross section taken on the line 5—5 of Fig. 3, looking in the direction of the arrows; Fig. 6 shows a cross section taken on the line 6—6 of Fig. 3, looking in the direction of the arrows; and Fig. 7 shows a cross section taken on the line 7—7 of Fig. 3, looking in the direction of the arrows.

In the several figures, the car body is designated by the numeral 8, and each of the trucks in its entirety is designated by the numeral 9. The side walls of the locomotive body are designated by the numeral 10. As shown particularly in Fig. 1, the central portion of the locomotive body extends down to a point considerably below those portions which are immediately above the trucks, and as shown in Fig. 2, the prime movers are mounted in this central portion. In the arrangement illustrated, two complete generating units are provided, each one comprising an internal combustion engine driving a generator. Each of the internal combustion engines illustrated is of six cylinder construction, the cylinders being mounted in pairs 11, although, of course, any other suitable prime mover construction might be used. These engines are mounted side by side, each with its six cylinders in a row, and one of the engines is adapted to drive a generator 12 at one end of the locomotive, while the other engine drives the generator 13 at the other end of the locomotive. It will be noted from an examination of Fig. 1 that the center lines of the two generators coincide substantially with the center line of the locomotive, and it will presently appear that this fact may be advantageously made use of in combination with the feature of mounting the generators higher up in the locomotive structure than the engines. It is preferred that a motor driven air compressor 14 be mounted at one end of the locomotive, while fuel tanks and a suitable heating plant 15 be mounted at the other end thereof, these serving to supply the necessary air for the air brake system and the necessary heat for the train, respectively.

Referring particularly to Figs. 3 to 7 inclusive, in the particular arrangement therein illustrated, each truck is provided with two driving axles 16 and 17, and with a pilot axle 18. These axles are suitably journaled in the truck frame, the driving axles preferably having rigid bearings therein, while the pilot axle is free for a certain amount of movement according to irregularities in the track structure, and to facilitate taking curves. Above each driving axle are mounted the driving motors 19. Owing to the amount of power to be transmitted into each driving axle, and for other considerations, it is preferred to mount the driving motors in pairs, one pair serving each driving axle, as shown particularly in Fig. 3. It may be stated that one advantage following from this arrangement is that the necessary motor power can be obtained with motor structures of less head-room than would be necessary were the entire motor power for each axle to be provided by a single motor. Between the driving axles of each truck, is mounted a truck bolster 20. This truck bolster is preferably half way between the driving axles, although under certain circumstances it might be desirable to have it closer to the driving axle 16 than to the axle 17, so as to obtain a slightly more uniform distribution of load on all of the axles, including the pilot axle. It will, however, be seen that it is extremely desirable for the pilot axle to be movably mounted, by reason of the fact that it is farther from the truck bolster than either of the driving axles, and by reason of the fact that the load carried by the pilot axle is comparatively small. It is preferred that a draw-bar 21 be connected to the forward end of the truck structure, so that only one-half of the total traction will be delivered through the framing of the locomotive itself.

From an examination of Fig. 3, it will be seen that each generator is mounted directly over the motors of one truck, and this fact largely determines or fixes the elevation at which the generator must be mounted. This in turn determines or fixes the elevation of the generator shaft 22. As a matter of design, the major portion of a prime mover is mounted above or to one side of the crank shaft thereof. Therefore, if the crank shaft of each prime mover were to be mounted in line with the corresponding generator shaft, the cylinders of the prime mover would extend to a very much greater height or elevation than the generator itself. As previously stated, the central portion of the locomotive is depressed with respect to its end portions so as to provide the necessary head-room for the engines. This fact results in a mounting of the engine crank shafts 23 considerably lower down than the corresponding generator shafts, and, therefore, it is necessary to provide some form of transmission from the one to the other.

It was previously shown that the two engines or prime movers are mounted side by side, as illustrated in Fig. 2, so that it would be necessary under any circumstances to provide some form of transmission from each engine shaft to the corresponding generator shaft, because the generators are mounted on the center line of the structure. I have availed myself of the fact that the engine shafts are offset from their respective generator shafts, both in a sidewise direction, and in a vertical direction, for securing an inter-relationship between the parts. As shown particularly in Fig. 7, the left-hand engine in said figure transmits power to the generator at the left-hand end of Fig. 2, said power being transmitted in a sidewise direction toward the center line of the car, as well as in a vertical direction, so as to carry up to the elevation of the generator. In similar manner the engine at the right-hand side of Fig. 7 transmits its power sidewise and upward to the generator 13 at the other end of the car, so that the respective portions or halves of the total power are transmitted upward as well as to the center line of the car in passing to their respective generator shafts. From the above discussion it will be apparent that there is a certain co-relation or combination between those major elements of a locomotive of this type in which the engines are mounted side by side on opposite sides of the center line of the structure, while their respective generators are mounted with their shafts at a different elevation from the engine shafts, and on the center line of the structure. In other words, certain new and desirable results are obtained in a structure embodying these arrangements, and these results are peculiarly desirable in a structure of this kind where large head-room is necessary in one portion of the structure to accommodate the height of the engines, while less head-room is necessary in other portions of the structure to accommodate the generators, although a greater elevation of the generators is necessary for the accommodation of the trucks which are mounted beneath them.

As a simple means of transmitting from each engine to the corresponding generator, I have illustrated a system of gearing. The same comprises a main gear 24 mounted on the engine shaft, meshing with an idler 25, which in turn meshes with a pinion 26 mounted on the generator shaft, or transmitting to the generator shaft. A bracket or standard 27 mounted alongside of the engine in a manner presently to be described carries the idler and the pinion. In the arrangement illustrated, the pinion is mounted on a short or stub shaft 28 which transmits to the generator shaft through the medium of a flexible coupling or the like 29. It will presently be seen that the gearing is mounted in a structure which is rigid with respect to the engine structure, and therefore this flexible coupling is desirable for the purpose of taking up any inequalities or vibrations of the engine structure with respect to the generator structure. Of course, any other suitable form of transmission from each engine shaft to its generator shaft might be adapted without in any manner departing from the spirit of my invention.

It was previously stated that one of the objects of the invention is to provide base portions or supporting structures for the engine and the generators, which portions may be integral with or constitute essential portions of the framework of the locomotive as a whole. By so doing, the entire structure can be built from a minimum weight of material, and at the same time the parts will be rigidly joined or related together so as to most effectually meet and withstand the various strains and stresses coming upon them.

It was previously shown that the central portions of the car structure are carried down below the end portions thereof. It is preferred that the lower portion of the side of the car be constructed in the form of truss members or the like 30 and 31, which extend substantially the distance between the body bolsters 20ᵃ. These truss members are formed of the same general configuration as the lower portions of the car sides, and they carry the major portion of the load imposed by the engines and generators. The base structure of the engine comprises essentially an elongated box-like member or the like 32 which is best illustrated in Figs. 3, 6, and 7. It has a plurality of crosswise extending webs or the like 33, the same extending across at points between the engine cylinders and at points just outside of the end cylinders of each engine. These crosswise extending webs serve to support a central structure 34 on which the pairs of cylinders 11 are mounted, and they also serve as supports for the bearings of the crank shafts. The arrangement of these webs will be readily seen from Fig. 6, in which the observer is looking toward the web between the left-hand pairs of cylinders, and in which the observer sees the crank shafts 23. This box-like supporting member for the engines has its side portions set against and secured to the truss members 30 and 31. These members are preferably built up from vertically extending plates against the edges of which are placed the angles 35 and the flange plates 36. The side portions of the box-like member are seated between the inner angles and flanges of the truss members, as shown particularly in Figs. 6 and 7, thereby rigidly locking the box-like member to the trusses. Of course, any suitable form of riveted or other connection may be used in addition to the seating arrangement illustrated. The end portions of this box-like member are extended out somewhat beyond the end cylinders, as shown particularly in Figs. 2 and 3, and these extending portions constitute supports for the brackets 27, in which the gear transmissions are mounted.

In this way a very rigid and effective support for the gears is provided.

The aforementioned box-like member extends throughout substantially the entire length of the depressed portion of the locomotive body. The generators on the other hand are mounted in those portions of the body where the truss members are sloping up toward the body bolsters. The ends of the bolsters are connected to the ends of the truss members and reinforce or sustain them at these points. I avail myself of the presence of the base member or casting for each generator for reinforcing the truss members at those points intermediate the body bolsters and the ends of the aforementioned base member for the engines.

The base member or casting for each generator is designated by the numeral 37. In general contour, it comprises a hollow box-like structure extending from side to side between the truss members and having the webs or flanges 38 seated against the truss members and secured thereto. These webs preferably seat nicely between the upper and lower angles from which the truss members are constructed, so that the base member is rigidly mounted and secured between the angles of the truss members.

It was previously stated that the crank shafts of the engines find bearings in the crosswise extending webs. In order to facilitate the removal and insertion of the crank shafts, I provide under bearing members 39 which seat beneath the webs 33 and are secured to the lower portions of the base member 32. By removing these bearing members 39, the crank shafts, including the pistons of the engines, can be lowered, so as to permit inspection of the interiors of the cylinders, and so as to permit replacement of the packing rings on the pistons, etc.

In order to permit removal of the cylinders in pairs, port holes or the like may be provided in the roof portion of the locomotive, said port holes being normally closed by means of the hatches 40, as shown, for example, in Fig. 6.

In order to close the lower portion of the box-like member 32, so as to protect the crank shafts from dust and the like, a pan or casing 41 may be mounted and supported beneath that portion of the member 32 which accommodates the cranks and crank shafts. This arrangement is shown particularly in Figs. 6 and 7. In like manner a casing 42 may be provided for closing in that portion of the structure beneath each train of gears.

From an examination of the foregoing structures, it will be apparent that the engines and generators are both supported indirectly through the medium of the longitudinal truss members 30 and 31, which members are secured rigidly together and are reinforced throughout practically their entire length by means of the base casting or members which support the engines and generators. It will also be apparent that the engines themselves are supported in the central portion of these trusses. By reason of this fact, the vibrations and shocks incident to the operation of the engines themselves will be taken up by those portions of the trusses which are secured to the box member 32, and will be transmitted indirectly through the truss members to the body bolsters. Therefore, the body bolsters themselves will not be subjected directly to the shocks and jars incident to the operation of the engines, with the result that a much smoother operating and more durable structure will result. Nevertheless, the arrangement is such that the total distance through which the strains are transmitted through the truss members themselves without the assistance or reinforcement of the member 32 is comparatively small, so that the trusses need not be of excessive size. In other words, by securing the side portions of the member 32 directly to the trusses the latter are reinforced throughout a substantial portion of their length, and in that portion which is subjected to the greatest bending force, namely, the central portion.

I do not limit myself to the features of construction shown in the drawings and described in the specification, but I include within the scope of my invention any equivalent arrangements and structures operating in equivalent manners to produce equivalent results.

When desired the electric connections may be effectuated in such manner as to transmit current directly from each generator to the driving motors of the corresponding truck, so that the distance through which the current will be transmitted may be made very small. Nevertheless, when this is done, interconnections may be provided between the two generators, so that in case of the disability of one of them, the other may supply current to all of the currents.

Where in the specification and claims I use the term "truss" or "girder", I contemplate not only the constructions such as those shown in the drawings, wherein the central portions are of greater depth than the end portions, but I also contemplate girders or trusses of various other forms, including those of uniform depth, unless otherwise specified or limited in the claims.

I claim:

1. In an electric vehicle, the combination with a pair of trucks, of a prime mover mounted in the vehicle between the trucks, the elevation of the driving shaft of the prime mover being limited by the available head room, a generator mounted over one of the trucks and with its shaft at a greater elevation than the driving shaft of the prime mover, and an operative connection from the driving shaft of the prime mover to the shaft of the generator.

2. In an electric vehicle, the combination with a pair of trucks, of a prime mover supported by the vehicle between the trucks, a generator supported by the vehicle at an elevation greater than that of one of the trucks, and an operative connection from a driving shaft of a prime mover to the driving shaft of the generator.

3. In an electric vehicle, the combination with a pair of trucks, of a prime mover supported by the vehicle between the trucks, the lower portion of the prime mover being mounted below the upper portions of the trucks, a generator supported by the vehicle at an elevation greater than that of the trucks, and an operative connection from the driving shaft of a prime mover to a shaft of the generator.

4. In an electric vehicle, the combination with a pair of trucks, of a pair of prime movers supported by the vehicle on opposite sides of the center line thereof, a generator supported by the vehicle at each end thereof, and an operative connection from each prime mover to a generator.

5. In an electric vehicle, the combination with a pair of trucks, of a prime mover supported by the vehicle on each side of the center line thereof, a generator supported by the vehicle at each end thereof with its shaft lying on the center line of the vehicle, and an operative connection from each prime mover to a generator.

6. In an electric vehicle, the combination with a pair of trucks, of a pair of prime movers supported by the vehicle between the trucks thereof and with one prime mover lying on each side of the center line of the vehicle, a generator supported by the vehicle at each end thereof, and an operative connection from each prime mover to a generator.

7. In an electric vehicle, the combination with a pair of trucks, of a pair of prime movers supported by the vehicle between the trucks, one prime mover lying on each side of the center line of the vehicle and with its lower portion below the upper portion of the trucks, a generator supported by the vehicle at each end thereof with its shaft lying on the center line of the vehicle, and an operative connection from each prime mover to a generator.

8. In an electric vehicle, the combination with a pair of trucks, of a pair of prime movers supported by the vehicle between the trucks thereof, the lower portions of the prime movers lying below the upper portions of the trucks, a generator supported by the vehicle above each truck thereof, the generators lying on the center line of the vehicle, and an operative connection from each prime mover to a generator.

9. In an electric vehicle, the combination with a pair of trucks, of a pair of longitudinally extending prime movers supported by the vehicle between the trucks thereof, the driving shafts of the prime movers lying on opposite sides of the center line of the vehicle and below the upper portions of the trucks, a generator mounted in the vehicle above each of the trucks and with its center line lying above the center line of the vehicle, and an operative connection from the driving shaft of each prime mover upward and sidewise to the shaft of a generator.

10. In an electric vehicle, the combination with a pair of side trusses, of a base frame mounted between and connected to the central portions of said trusses, a pair of prime movers mounted on said base frame, and a generator operatively connected to each prime mover.

11. In an electric vehicle, the combination with a pair of truss-shaped side frame members, of a base member mounted between and secured to the central depressed portions of said truss members, a prime mover mounted upon and secured to said base member, and a generator operatively connected to the prime mover.

12. In an electric vehicle, the combination of a pair of oppositely disposed side frame members, a base member mounted between and secured to the frame members, a plurality of crosswise extending reinforcing webs in said base member, journals in said webs, removable sections in the lower portions of the webs and beneath the journals, a crank shaft mounted in and working in the journals, a prime mover supported by the base member and operating on said crank shaft, and a generator operatively connected to the crank shaft.

13. In an electric vehicle, the combination with a pair of oppositely disposed side frame members, of a central base member mounted between and secured to the central portions of the frame members, a pair of prime movers mounted upon and secured to said base members, other base members mounted between and secured to the end portions of the frame members, a generator mounted upon and secured to each of said last named base members, and an operative connection from each prime mover to a generator.

14. In an electric vehicle, the combination with a pair of trucks, of a pair of prime movers supported by the vehicle between the trucks, a generator mounted above each truck and serving to directly feed current to the motors thereof, and an operative connection from each prime mover to a generator.

15. In an electric vehicle, the combination of an engine base member, a generator base member located adjacent to each end thereof, longitudinally extending truss members having their central portions rigidly connected to the sides of the engine base member, and having their end portions rigidly connected to the sides of the generator base members to provide in conjunction with the engine base member and the generator base members a rigid under-framing, a generator mounted on each generator base member, two sets of engine cylinders and crank shafts connected to the engine base member, and an operative connection from each crank shaft to the corresponding generator.

16. In an electric vehicle, the combination of an engine base member, a generator base member adjacent to one end of the same, rigid side members having their central portions rigidly connected to the sides of the engine base member and having their end portions rigidly connected to the generator base member, and constituting in conjunction with the engine base member and the generator base member a rigid under-framing for the vehicle, a generator mounted on the generator base member, engine cylinders and a crank shaft connected to the engine base member, and an operative connection from the crank shaft to the generator.

17. In an electric vehicle, the combination of an engine base member of width substantially equal to the width of the vehicle, generator base members of width substantially equal to the width of the vehicle and mounted adjacent to the ends of the engine base member, connecting members having their lower edges of substantially truss shape having their central portions rigidly connected to the sides of the engine base member and having their end portions rigidly connected to the sides of the generator base members, and constituting in conjunction with the engine base member and the generator base members a rigid under-framing, a generator mounted on each generator base member, two pairs of engine cylinders connected to the engine base member, two crank shafts connected to the engine base member, and an operative connection from each crank shaft to the corresponding generator.

18. In an electric vehicle, the combination of an engine base member, a longitudinally extending crank shaft beneath the same, bearing blocks supporting the crank shaft and connected to the under portion of the base member, engine cylinders connected to the upper portion of the engine base member, a generator base member adjacent to one end of the engine base member, a generator mounted thereon, and a longitudinally extending supporting member on each side of the vehicle, each supporting member being rigidly connected to the engine base member and to the generator base member, whereby the engine and generator base members and the supporting members together constitute a rigid under-framing for the vehicle.

19. In an electric vehicle, the combination of an engine base member, a pair of longitudinally extending crank shafts beneath the same, bearing blocks mounted beneath the base member and carrying the crank shaft, engine cylinders connected to the upper portion of the engine base member, a generator base member adjacent to each end of the engine base member, a longitudinally extending connecting member on each side of the vehicle, each connecting member being rigidly secured to the engine base member and both of the generator base members, whereby all of the base members and the connecting members together constitute a rigid under-framing for the vehicle, a generator mounted on each generator base member, and an operative connection from each crank shaft to the corresponding generator.

20. An under-framing for an electric vehicle comprising an engine base member of width substantially equal to the width of the vehicle, a generator base member adjacent to each end of the engine base member, each generator base member being of width substantially equal to the width of the vehicle, and a longitudinally extending supporting member on each side of the vehicle, each supporting member having its central portion rigidly connected to the engine base member and having its end portions rigidly connected to the generator base members.

21. An under-framing for an electric vehicle comprising an engine base member, a generator base member adjacent to each end of the same, and a longitudinally extending supporting member on each side of the vehicle, each supporting member having its lower edge of truss shaped formation, and having its central portion rigidly connected to the engine base member and its end portions rigidly connected to the generator base members.

22. An under-framing for an electric vehicle comprising an engine base member having crank shaft bearing sockets in its lower face, a generator base member adjacent to each end of the engine base member, and a longitudinally extending supporting member on each side of the vehicle, each supporting member having its central portion rigidly connected to the engine base member and having its end portions rigidly connected to the generator base members.

23. An under-framing for an electric vehicle comprising an engine base member of substantially box-like formation having a plurality of downwardly depending crosswise extending web members, a crank shaft bearing socket in the lower face of each of said webs, a generator base member adjacent to each end of the engine base member, and a longitudinally extending connecting member on each side of the framing, each connecting member being rigidly joined to the engine base member and to each generator base member.

JOSEPH H. AMES.

Witnesses:
 THOMAS A. BANNING, Jr.,
 FRANCES M. FROST.